(12) United States Patent
Mehrotra et al.

(10) Patent No.: US 8,756,198 B2
(45) Date of Patent: *Jun. 17, 2014

(54) ENHANCING DATA STORE BACKUP TIMES

(75) Inventors: Gaurav Mehrotra, Pune (IN); Abhinay R. Nagpal, Pune (IN); Sandeep R. Patil, Elmsford, NY (US); Rulesh F. Rebello, Thane (IN)

(73) Assignee: International Business Machines Corporation, Armonk, NY (US)

( * ) Notice: Subject to any disclaimer, the term of this patent is extended or adjusted under 35 U.S.C. 154(b) by 302 days.

This patent is subject to a terminal disclaimer.

(21) Appl. No.: 12/893,797

(22) Filed: Sep. 29, 2010

(65) Prior Publication Data

US 2012/0078843 A1    Mar. 29, 2012

(51) Int. Cl.
*G06F 7/00*    (2006.01)
*G06F 17/00*    (2006.01)

(52) U.S. Cl.
USPC ............................................. 707/640

(58) Field of Classification Search
USPC ............................................. 707/640
See application file for complete search history.

(56) References Cited

U.S. PATENT DOCUMENTS

| | | | |
|---|---|---|---|
| 6,173,223 B1 * | 1/2001 | Liubakka et al. | 701/42 |
| 6,611,609 B1 * | 8/2003 | Zhu | 382/103 |
| 6,907,410 B2 * | 6/2005 | Chang et al. | 706/13 |
| 6,907,411 B2 * | 6/2005 | Chang et al. | 706/13 |
| 6,973,257 B1 * | 12/2005 | Park et al. | 386/241 |
| 7,225,208 B2 * | 5/2007 | Midgley et al. | 1/1 |
| 7,398,366 B2 | 7/2008 | Ohran et al. | |
| 7,694,088 B1 | 4/2010 | Bromley et al. | |
| 2003/0069864 A1 * | 4/2003 | Chang et al. | 706/13 |
| 2005/0055521 A1 | 3/2005 | Saika | |
| 2005/0216788 A1 | 9/2005 | Mani-Meitav et al. | |
| 2006/0004846 A1 | 1/2006 | Murley et al. | |
| 2006/0059384 A1 | 3/2006 | Helliker | |
| 2006/0200436 A1 * | 9/2006 | Zhou et al. | 706/13 |
| 2008/0177961 A1 | 7/2008 | McSharry et al. | |
| 2010/0005151 A1 | 1/2010 | Gokhale | |

OTHER PUBLICATIONS

Chaudhuri et al., "Self-Tuning Database Systems: A Decade of Progress", VLDB '07, Sep. 23-28, 2007, Vienna, Austria. Copyright 2007 VLDB Endowment, ACM 978-1-59593-649—Mar. 7, 2009.*
Preliminary Remarks, Apr. 18, 2012, for U.S. Appl. No. 13/448,853, filed Apr. 17, 2012 by G. Mehrotra et al., Total 1 p. [57.226C1 (PrelimRemark)].
U.S. Appl. No. 13/448,853, filed Apr. 17, 2012, entitled "Enhancing Data Store Backup Times", invented by Mehrotra, G, A.R. Nagpal, S.R. Patil, and R.F. Rebello, Total 36 pp. [57.226C1 (Appln)].

(Continued)

*Primary Examiner* — Tony Mahmoudi
*Assistant Examiner* — Muluemebet Gurmu
(74) *Attorney, Agent, or Firm* — Konrad Raynes Davda & Victor LLP; Janaki K. Davda

(57) ABSTRACT

Provided are techniques for selecting a first group of indexes to form a current generation of indexes, selecting indexes from the first group biased to indexes with higher fitness values from the current generation of indexes, forming sub-groups of indexes using the selected indexes, determining fitness values of each of the sub-groups based on the fitness value of each of the indexes, selecting a subset of the sub-groups; and placing the indexes in the selected sub-groups into a new generation of indexes.

14 Claims, 14 Drawing Sheets

(56) References Cited

OTHER PUBLICATIONS

Agrawal, S., S. Chaudhuri, and V. Narasayya, "Automated Selection of Materialized Views and Indexes for SQL Databases", Proceedings of the 26th International Conference on Very Large Databases, Cairo, Egypt, 2000, Total 10 pp.

Chaudhuri, S. and V. Narasayya, "An Efficient, Cost-Driven Index Selection Tool for Microsoft SQL Server", Proceedings of the 23rd VLDB Conference Athens, Greece, 1997, Total 10 pp.

Chaudhuri, S. and V. Narasayya, "Self-Tuning Database Systems: A Decade of Progress", 2007, ACM, VLDB '07, Sep. 23-28, 2007, Vienna, Austria, Total 12 pp.

Martin, P., W. Powley, and D. Benoit, "Using Reflection to Introduce Self-Tuning Technology into DBMSs", Database Engineering and Applications Symposium, 2004, IDEAS '04, Proceedings. International Coimbra, Portugal Jul. 7-9, 2004, Total 10 pp.

PCT International Search Report and Written Opinion, Nov. 8, 2011, for PCT/EP2011/065410, Total 8 pp.

Hou, M., D. Wang, M. Xu, and J. Yang, "Selective Protection: A Cost-Efficient Backup Scheme for Link State Routing", 2009 9th IEEE International Conference on Distributed Computing Systems, © 2009 IEEE, Total 8 pp.

Lai, K.K., L. Yu, S. Wang, and C. Zhou, "A Double-Stage Genetic Optimization Algorithm for Portfolio Selection", [online], © Springer-Verlag Berlin Heidelberg 2006, retrieved from the Internet at URL: <http://www.scribd.com/doc/13846148/A-DoubleStage-Genetic-Optimization-Algorithm-for-Portfolio-Selection>, Total 10 pp.

Wang, D., L. Wang, and J. Song, "SEDBRS: A Secure and Efficient Desktop Backup and Recovery System", First International Symposium on Data, Privacy and E-Commerce, © 2007 IEEE, Total 6 pp.

Ward Systems Group Inc., "Elitist Selection", [online], [Retrieved on Aug. 23, 2010]. Retrieved from the internet at <URL: http://www.wardsystems.com/manuals/genehunter/elitistselection.htm>, Total 1 p.

Wikipedia, "Genetic Algorithm", [online], [Retrieved on Sep. 15, 2010]. Retrieved from the Internet at URL: http://en.wikipedia.org/wiki/Genetic_algorithm>, Last modified on Sep. 12, 2010, Total 17 pp.

Wikipedia, "Particle Swarm Optimization", [online], [Retrieved on Sep. 15, 2010]. Retrieved from the Internet at URL: <http://en.wikipedia.org/wiki/Particle_swarm_optimization>, Last modified on Sep. 13, 2010, Total 4 pp.

Williams, W., "Genetic Algorithms: A Tutorial", [online], [Retrieved on Sep. 15, 2010]. Retrieved from the Internet at URL: <web.mst.edu/~ercal/387/slides/GATutorial.ppt>, Total 33 pp [Alternate source: http://www.cs.drexel.edu/~spiros/teaching/SE320/slides/ga.pdf].

Won, Y., J. Ban, J. Min, J. Hur, S. Oh, and J. Lee, "Efficient Index Lookup for De-duplication Backup System", © 2008 IEEE, Total 3 pp.

Yang, T., D. Feng, J. Liu, Y. Wan, Z. Niu, and Y. Ke, "3DNBS: A Data De-duplication Disk-based Network Backup System", © 2009 IEEE, Total 8 pp.

Yang, T., D. Feng, J. Liu, and Y. Wan, "FBBM: A New Backup Method with Data De-duplication Capability", © 2008 IEEE, Total 6 pp.

Amendment 1, Dec. 27, 2012, for U.S. Appl. No. 13/448,853, filed Apr. 17, 2012 by G. Mehrotra et al., Total 6 pp. [57.226C1 (Amend1)].

Amendment 2, Jul. 1, 2013, for U.S. Appl. No. 13/448,853, filed Apr. 17, 2012 by G. Mehrotra et al., Total 6 pp. [57226C1 (Amend2)].

Office Action 1, Sep. 27, 2012, for U.S. Appl. No. 13/448,853, filed Apr. 17, 2012 by G. Mehrotra et al., Total 32 pp. [57226C1 (OA1)].

Office Action 3, dated Aug. 16, 2013, for U.S. Appl. No. 13/448,853, filed Apr. 17, 2012, 24 pp. [57.226C1 (OA3)].

Response to Office Action 3, dated Nov. 18, 2013, for U.S. Appl. No. 13/448,853, filed Apr. 17, 2012, 8 pp. [57.226C1 (ROA3)].

\* cited by examiner

1100

```
/**
* Determine a fitness value of an index. The higher the fitness value, the more fit the index. This function
returns a same fitness value for two equivalent indexes.
@param a_subject the index to evaluate
* *
@return positive double reflecting the fitness value of the given * index.
*/
public double evaluate(IIndex a_subject) {
boolean defaultComparation = a_subject.getConfiguration().getFitnessEvaluator().isFitter(2, 1);
// The fitness value measures both how close the value is to a target time amount supplied by the user
represented by the solution. This is done in two steps: the first step considers only the represented
amount of //change vs. the target amount of change and returns higher fitness values for amounts closer
to the target, and lower fitness values for amounts further away from the target.
//Step 2 returns a higher fitness value for solutions representing a higher Index Performance Ratio (IPR),
and lower fitness values for solutions representing a lower IPR.
// ----------------------------------------------------------------
// Fitness factors include:
//profiling the underlying disk technology and utilizes this information for a faster backup response //by
reading indexes for backing up from faster, more robust and greener disks first (e.g., SSD);
//calculating which disks and other physical apparatus are more worn out and copy indexes from //them
at end;
//selecting block indexes defined over most frequently used table partititon in a range partitioned table;
//selecting high affinity indexes;
//selecting indexes defined over user critical data;
//Indexes with locality of reference;
//Indexes which are least latched at time of backup process;
//Indexes are selected for backup such that distribution coefficient of the indexes and parallelism factor
remains high.

int changeAmount = costofaccess_Disk(a_subject);
int totalACCESS = getACCESS_Count(a_subject); // the technique includes the access frequency for a
index as well as the partition over which its defined
int totalMTRF = getMTRF(a_subject);
int changeDifference = Math.abs(m_targetAmount - changeAmount);
double fitness;
if (defaultComparation) {
fitness = 0.0d;
}
else {
fitness = MAX_BOUND/2;
}
```

```
// Step 1: Determine distance of amount represented by solution from
// the target amount. If the change difference is greater than zero,
// divide one by the difference in change between the
// solution amount and the target amount. In the case where the change
// difference is zero it means that the technique has the correct amount and the technique //assigns a higher fitness value
//----------------------------------------------------
if (defaultComparation) {
fitness += changeDifferenceBonus(MAX_BOUND/2, changeDifference);
}
else {
fitness -= changeDifferenceBonus(MAX_BOUND/2, changeDifference);
}

// Step 2: Divide the fitness value by a time penalty based on the IPR
// -----------------------------------------------------------------
if (defaultComparation) {
fitness -= computePenalty(MAX_BOUND/2, totalIPR);
}
else {
fitness += computePenalty(MAX_BOUND/2, totalIPR);
}
// Make sure fitness value is always positive.
// -----------------------------------------
return Math.max(1.0d, fitness);
} public double computePenalty {

// If index chosen in set to be backedup resides on disk with I/O bottleneck lower the fitness
// Lower fitness for indexes on HDD as compared to HDD
}
```

FIG. 11B

ENHANCING DATA STORE BACKUP TIMES

BACKGROUND

1. Field

Embodiments of the invention relate to enhancing data store backup times.

2. Description of the Related Art

Relational DataBase Management System (RDBMS) software may use a Structured Query Language (SQL) interface. The SQL interface has evolved into a standard language for RDBMS software and has been adopted as such by both the American National Standards Institute (ANSI) and the International Standards Organization (ISO).

A RDBMS uses relational techniques for storing and retrieving data in a relational database. Relational databases are computerized information storage and retrieval systems. Relational databases are organized into tables that consist of rows and columns of data. The rows may be called tuples or records or rows. A database typically has many tables, and each table typically has multiple records and multiple columns.

A table in a database can be accessed using an index. An index is an ordered set of references (e.g., pointers) to the records in the table. The index is used to access each record in the table using a key (i.e., one of the fields or attributes of the record, which corresponds to a column). The term "key" may also be referred to as "index key". Without an index, finding a record requires a scan (e.g., linearly) of an entire table. Indexes provide an alternate technique to accessing data in a table. Users can create indexes on a table after the table is built. An index is based on one or more columns of the table.

A query may be described as a request for information from a database based on specific conditions. A query typically includes one or more predicates. A predicate may be described as an element of a search condition that expresses or implies a comparison operation (e.g., A=3).

Some databases have a tablespace architecture, where a tablespace may be described as a logical entity containing tables and indexes. In certain databases, tablespaces may be described as a data file and is used to map the logical schema of the database to disk. In a database, data rows are stored in tables, and the tables exist in the tablespaces. The tablespaces are made up of one or more containers. A container may be described as a physical unit of storage (e.g., similar to a file, a filesystem or a raw device).

In certain databases, there are two types of tablespaces: System Managed Storage (SMS) and Database Managed Storage (DMS). In certain databases, the object that is used to map the logical schema of the database to disk is called a tablespace. In certain other databases, this object is called a data file. A tablespace may be mapped to storage objects using containers.

In some databases, indexes are represented by a fully linked tree. A fully linked tree may be described as a tree in which nodes may contain a "nextNode" pointer and a "prevNode" pointer. These pointers are the pool-relative page identifies (PageIDs) of the nodes, which come immediately before or immediately after the current node on the same level. Having these extra pointers is useful in doing "lookaheads" in the binary tree (BTree) structure when prefetching. The pointers are easy to maintain and contain useful information.

FIG. 1 illustrates, in a block diagram, a prior art fully linked tree 100. In FIG. 1, a root node 110 has three branches to three intermediate nodes 110, 130, 150. Intermediate node 130 has branches to leaf nodes 132, 134, 136. Leaf node 134 has slots 138, and one of the slots points to a key and a row identifier (RID) 140. The RID has a page field that points to a data page 160 and a slot field that points to a slot in a set of slots 162 on the data page 160. The slot that is being pointed to, in turn, points to a data record 164.

FIG. 2 illustrates, in a block diagram, prior art block indexes 200. Block indexes are similar to "normal" (i.e., traditional) indexes, but block indexes have pointers to blocks instead of to individual data records (e.g., data record 164 in FIG. 1). A block may be described as a group of consecutive pages that have the same key values in all dimensions. In FIG. 2, the blocks are: East 97, East 98, North 99, South 99, and West 00. For example, the records in the West 00 block 230 are from the West region and from the year 2000. In FIG. 2, the region block index 210 and the year block index 220 point to these blocks.

A table and an associated index may be in the same tablespace or in different tablespaces. FIG. 3 illustrates, in a block diagram, a prior art table 300 and two indexes 310, 320 that are stored in one index tablespace 330.

Databases allow tablespace backup and restore. To backup a table, the tablespace containing the table is backed up. When doing tablespace backup, if the tablespace contains indexes, the indexes are included in the backup of the tablespace.

Due to differences (e.g., time and system resources) between backing up with a 100 Gigabyte (100 G) database and a 1 Terrabyte (1 T) database, it may be inefficient to backup the entire tablespace.

Assume there is a table that is 500 G in size, and the table has 4 indexes. In this example, each of the indexes contains all columns of the table with different orders for performance. For this example, the table and the four indexes are stored in one tablespace. When a backup of the table is requested, instead of just backing up the table of 500 G, the tablespace is backed up, which results in backing up the 500 G table and 4, 500 G indexes, for a total of 2.5 T of data to backup. This results in operational challenges and requires large system resource, especially for daily backup Some systems allow selective backup. For example, in order to back up the contents of a large hard drive onto a medium that is too small to back up everything, a user can choose to back up some files and leave the rest at risk (i.e., without being backed up). This may be done using some of the same backup programs that create full backups. For example, some users choose to back up pictures, documents, and other unique files, and expect to reinstall the operating system and applications, if the hard drive crashes or is corrupted (e.g., by a virus). In a WINDOWS® operating system environment, if the user backs up the "My Documents" folder, the user will get most of the unique files. (WINDOWS is a registered trademark of Microsoft Corporation in the United States and/or other countries.)

Also, if the user backs up to a Universal Serial Bus (USB) flash drive or other small capacity medium, the user decides what files to backup. If the user collects digital photographs and music, the user may not be able to fit everything in the "My Documents" folder onto such backup media. Thus, the question then is one of how files are to be selected for back up.

Some systems provide more automated ways of selecting files to back up. For example, differential and incremental backups are automated selective backups. With such backups, there is a full backup initially. Then, after some files change, differential and incremental backups are used to back up the files that have changed since the full backup.

With reference to incremental backup, if an image backup or a full backup has been created, the operating system has marked those files as backed up. Later, the user saves new files to the hard drive or modifies old ones. These changes are not in the backup. Some systems offer the option of automatically backing up the files that have changed since the most recent backup. Once this incremental backup is complete, these new and changed files are marked as backed up, so that when the user does another incremental backup, these files will not be backed up again. Each incremental backup is relatively small and quick to make, but, to fully restore the hard drive, the user has to restore the most recent full or image backup and then follow that by restoring each of the incremental backups in the order they were recorded. The user can later shorten this list of backups to restore by making a new image or full backup.

The differential backup works like the incremental backup, except, when the smaller backup is done, the new and changed files are not marked as backed up. This means that when subsequent backups will back up all the files that are not backed up in the most recent full backup.

Incremental backups are more thorough. For example, a user can restore files that were deleted or overwritten after the last full backup, but before the most recent incremental backup. However, finding a specific file amid a collection of incremental backups can be challenging. Some backup programs offer indexes that help find specific files. Differential backups offer simpler full restores (i.e., just restore the most recent full backup and the most recent differential backup). The user may lose files, however, if the files were created after the most recent full backup and deleted or overwritten before the most recent differential backup.

In high activity On-Line Transaction Processing (OLTP) systems, incremental backups are very big as many changes are done to the database.

Thus, there is a need for enhancing data store (e.g., database) backup times.

BRIEF SUMMARY

Provided are a method, computer program product, and system for selecting a first group of indexes to form a current generation of indexes, selecting indexes from the first group biased to indexes with higher fitness values from the current generation of indexes, forming sub-groups of indexes using the selected indexes, determining fitness values of each of the sub-groups based on the fitness value of each of the indexes, selecting a subset of the sub-groups, and placing the indexes in the selected sub-groups into a new generation of indexes.

BRIEF DESCRIPTION OF THE SEVERAL VIEWS OF THE DRAWINGS

Referring now to the drawings in which like reference numbers represent corresponding parts throughout:

FIG. 7 is formed by FIGS. 7A and 7B.

FIG. 11 illustrates sample pseudocode for a fitness function in accordance with certain embodiments. FIG. 11 is formed by FIGS. 11A and 11B.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Embodiments allow a user (e.g., a DataBase Administrator (DBA)) to back up a table and one or more selected indexes (e.g., the best or mostly used indexes). Then, if there is a need to recover the table and/or indexes, the user recovers the backed up table and selected indexes and recovers or re-builds the remaining indexes (i.e., the ones that were not selected to be backed up with the table).

Figure 1:
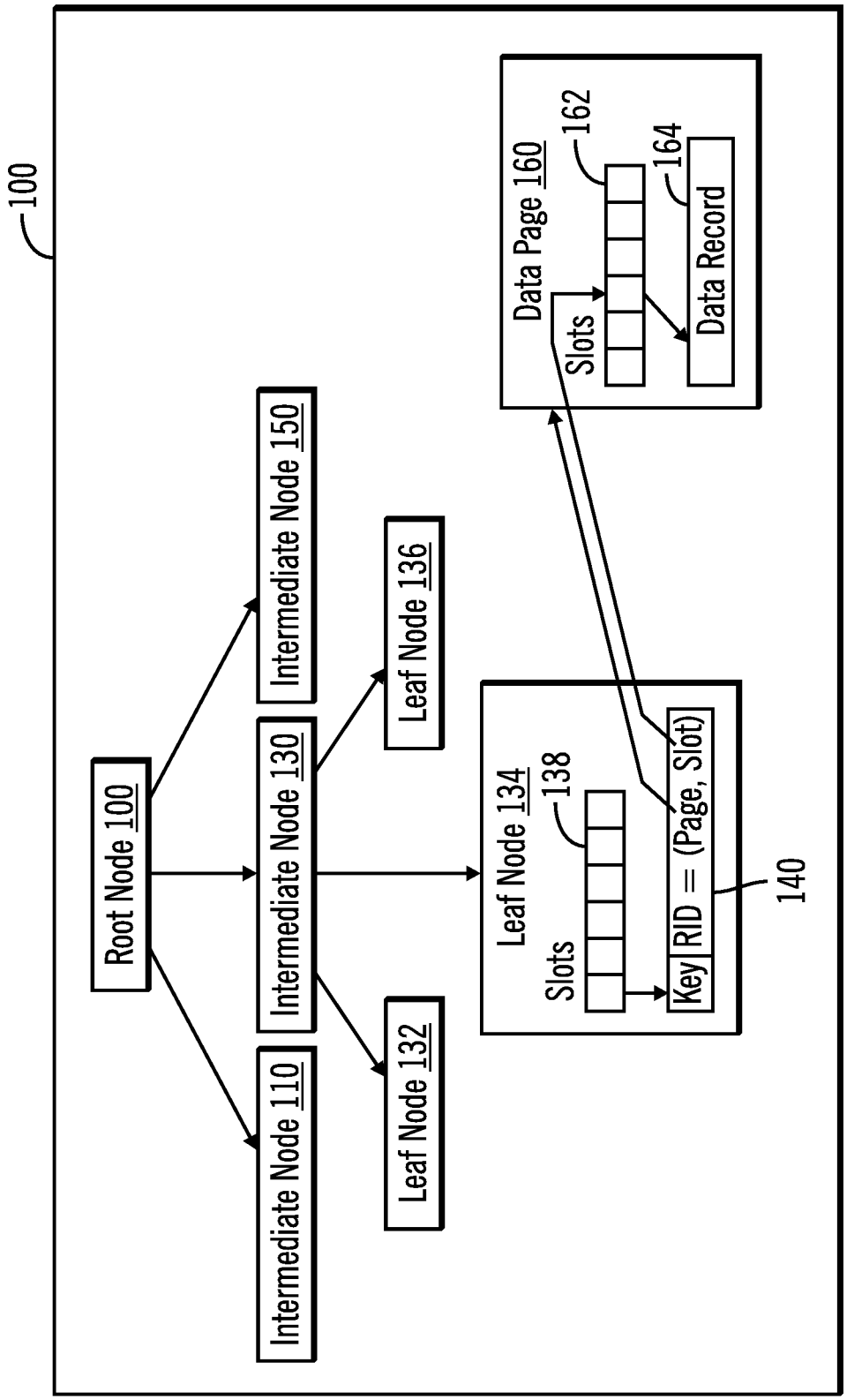
FIG. 1 illustrates, in a block diagram, a prior art fully linked tree.
Figure 2:
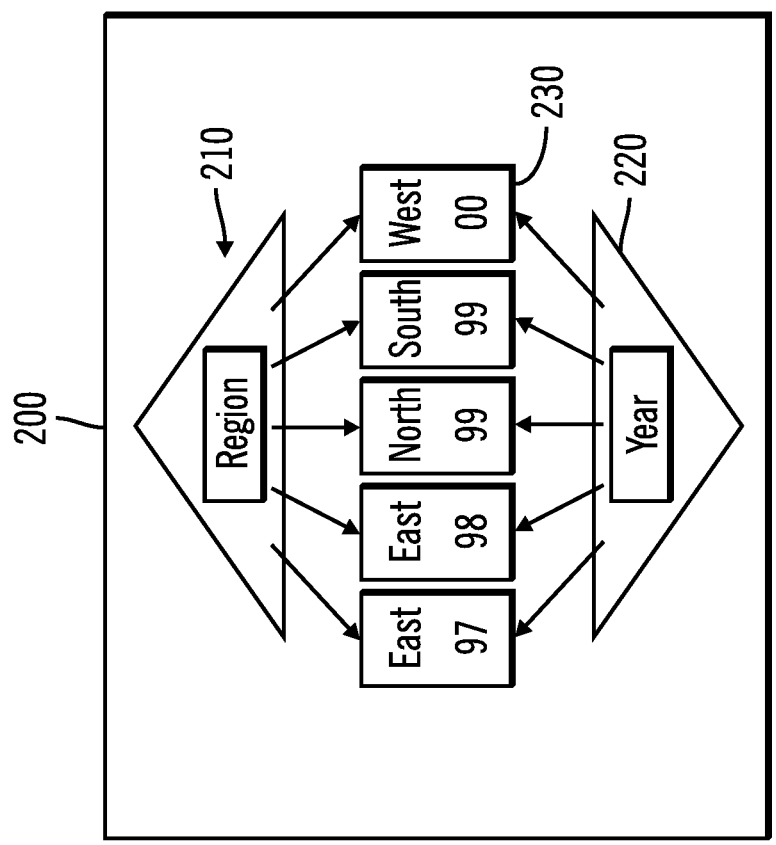
FIG. 2 illustrates, in a block diagram, prior art block indexes.
Figure 3:
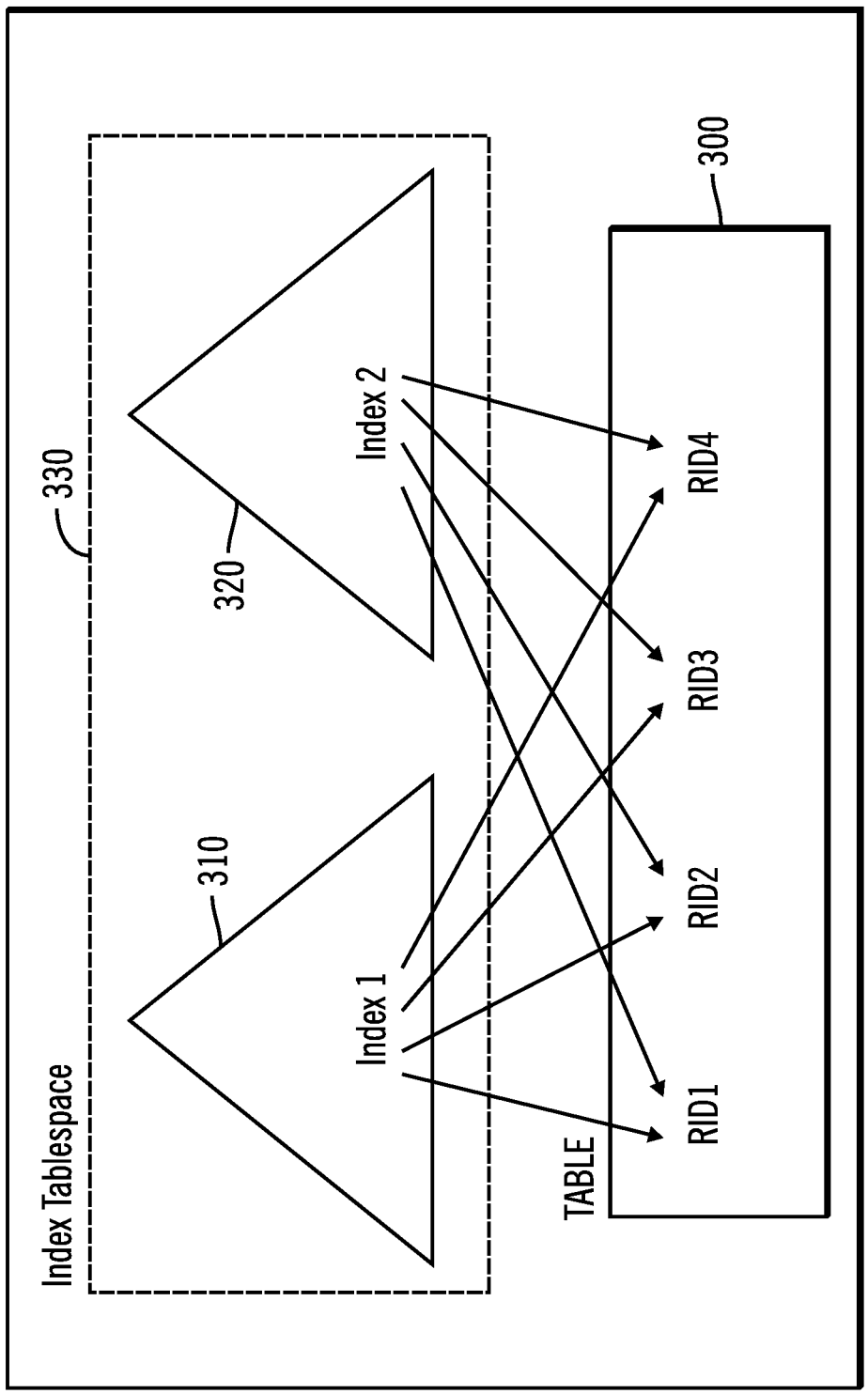
FIG. 3 illustrates, in a block diagram, a prior art table and two indexes that are stored in one tablespace.
Figure 4:
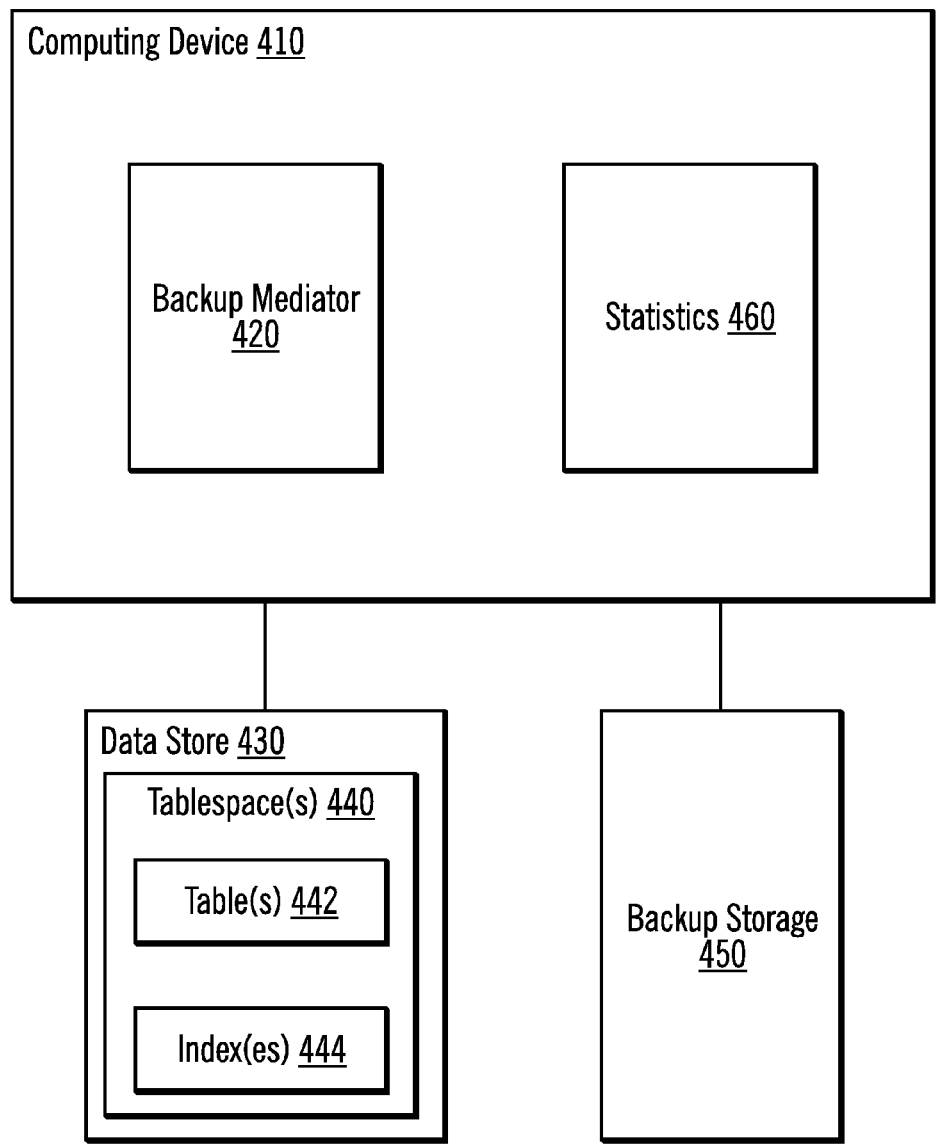
FIG. 4 illustrates, in a block diagram, a computing architecture in accordance with certain embodiments.

FIG. 4 illustrates, in a block diagram, a computing architecture in accordance with certain embodiments. A computing device 410 includes a backup mediator 420 and statistics 460.

The computing device 410 is also coupled to a data store 430 and to backup storage 450. In certain embodiments, the computing device 410 is a server that is also coupled to a client (not shown). In certain embodiments, the data store 430 is a database. The data store 430 stores at least one tablespace 440, which stores at least one table 442 and one or more indexes 444 for the at least one table 442. Merely for ease of understanding, one tablespace 440 containing one table 442 is shown. However, the data store 430 may contain any number of tablespaces, and each tablespace may contain any number of tables and indexes. The backup mediator 420 uses the statistics 460 to select one or more indexes 444 for backup.

In certain embodiments, the backup storage 450 is remote storage (e.g., located physically distant or remote from the computing device 410).

Figure 5:
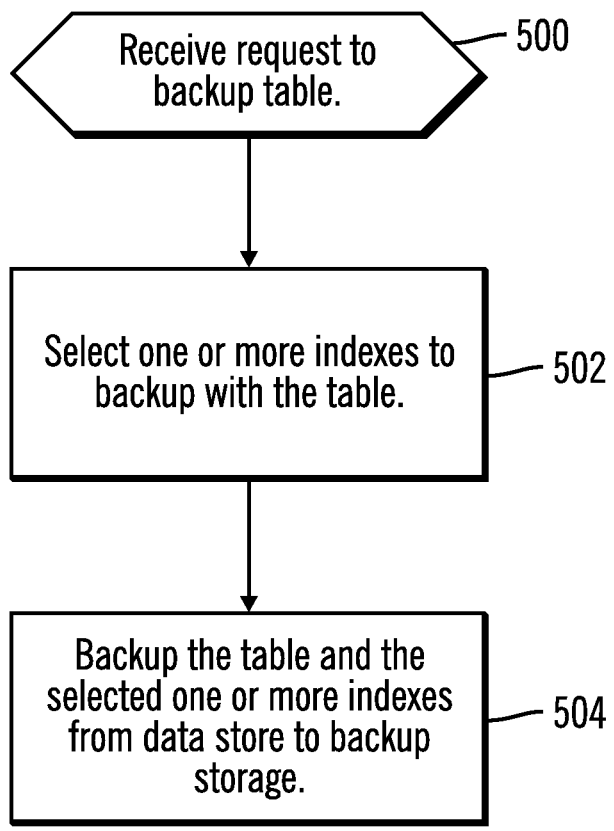
FIG. 5 illustrates, in a flow diagram, logic performed by a backup mediator to backup a table in accordance with certain embodiments.

FIG. 5 illustrates, in a flow diagram, logic performed by the backup mediator 420 to backup a table in accordance with certain embodiments. Control begins at block 500 with the backup mediator 420 receiving a request to backup a table 442. In block 502, the backup mediator 420 selects one or more indexes 444 to backup with the table 442. In block 504, the backup mediator 420 backs up the table 444 and the selected one or more indexes 444 from the data store 430 to the backup storage 450.

The backup mediator 420 selects the one or more indexes using statistics 460 (e.g., stored in a statistics index). In certain embodiments, the statistics 460 provide table information and index information for each Tablespace Control Block (TCB) loaded into memory. In certain embodiments, the statistics 460 are valid for a period of time (e.g., since the data store 430 was last restarted). In certain embodiments, the backup mediator 420 continuously polls and uses the statistics 460.

In certain embodiments, the backup mediator 420 performs real time backup of the data store 430 to enable faster backup times (e.g., typically systems spread over hybrid disks). The backup mediator 420 determines a fitness value for an index 444 based on one or more of the following fitness factors using information provided in the statistics 460:

1) profiling of the underlying storage (e.g., disk) technology and utilizing this information for a faster backup response by reading indexes for backing up from faster, more robust, and greener (i.e., better for the environment) disks first (e.g., solid state disks), and indexes on such disks are given higher fitness values;

2) calculating which storage (e.g., disks and other physical apparatus) are more worn out and copying indexes from this storage last (i.e., indexes on this storage are copied last);

3) selecting block indexes defined over most frequently used table partitions in a range partitioned table, and such indexes are given higher fitness values;

4) selecting high affinity indexes (i.e., highly used or highly accessed indexes), and such indexes are given higher fitness values;

5) selecting indexes defined over user critical data (e.g., a user tags data as critical or other techniques are used to determine which data is user critical), and such indexes are given higher fitness values;

6) selecting indexes with locality of reference (i.e., indexes which are more likely to be used as soon as the data store is restored or restarted after a crash of the data store), and such indexes are given higher fitness values;

7) selecting indexes which are least latched at time of backup process (i.e., those indexes with fewer locks), and such indexes are given higher fitness values; and 8) selecting indexes such that distribution coefficient of the indexes and parallelism factor remains high (i.e., selecting indexes based on how they are distributed across processors or storage devices), and such indexes are given higher fitness values.

For example, with reference to the third fitness factor, the following Pseudocode A describes creating a table that is partitioned:

---

Pseudocode A

---

```
CREATE TABLE orders(id INT, shipdate DATE, . . .)
PARTITION BY RANGE(shipdate)
(
  STARTING '1/1/2006' ENDING '12/31/2006'
  EVERY 3 MONTHS
)
```

---

Figure 6:
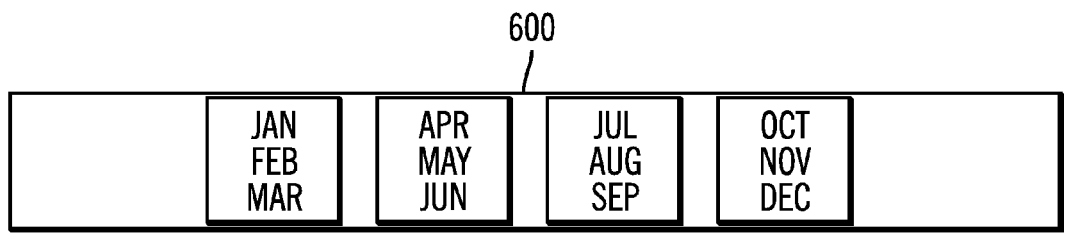
FIG. 6 illustrates, in a block diagram, partitioned tables in accordance with certain embodiments.

FIG. 6 illustrates, in a block diagram, partitioned tables 600 in accordance with certain embodiments. The tables are partitioned in accordance with the pseuodcode. In certain embodiments, with reference to the third fitness factor, the backup mediator 420 finds a most accessed table partition and ranks indexes defined over this partition with a higher fitness value.

Embodiments address the problem of selecting the one or more indexes 444 to backup as a non linear optimization problem. With embodiments, the backup mediator 420 may apply any heuristic approach or regression technique over the fitness factors to select the one or more indexes 444 for backup.

The backup mediator 420 uses a genetic technique (e.g., an algorithm) and a selection technique (e.g., roulette wheel selection (e.g., an algorithm) or elitist selection) to choose the indexes to be backed up. Roulette wheel selection may be described as selecting indexes to be used in a next generation of indexes randomly. Elitist selection may be described as a selection strategy in which a limited number of indexes with the best fitness values are chosen to pass to the next generation of indexes, avoiding crossover and mutation operators. Elitism may prevent random destruction by crossover or mutation operators of indexes with good fitness values. In certain embodiments, the number of elite indexes should not be too high, otherwise the population of indexes may tend to degenerate.

The genetic technique imitates the natural selection process in biological evolution with selection, crossover, and mutation. The genetic technique may be described as a set of procedures modeled after genetics and evolution. Genetics provide the chromosomal representation to encode the solution space of a problem, while evolutionary procedures are designed to efficiently search for attractive solutions to large and complex problems. Usually, the genetic technique is based on the survival-of-the-fittest fashion by gradually manipulating the potential problem solutions to obtain the more superior solutions in population. The genetic technique is intrinsically parallel and inclined to determine the global optimum. Since the genetic technique can generate many offspring in a complete loop, the genetic technique can explore the search space in a multi-directional way. The genetic technique has been proven to be effective at escaping local optima and discovering the global optimum through genetic operations in some problems.

With crossover, there is a transfer of information between successful solutions, which means offspring can benefit from what parents have learned, and parental schemata can be mixed and combined so as to reproduce next generations with strengths of both their parents. Therefore, the genetic technique has a higher probability of finding a global optimal solution in a relatively short time.

Figure 7A:
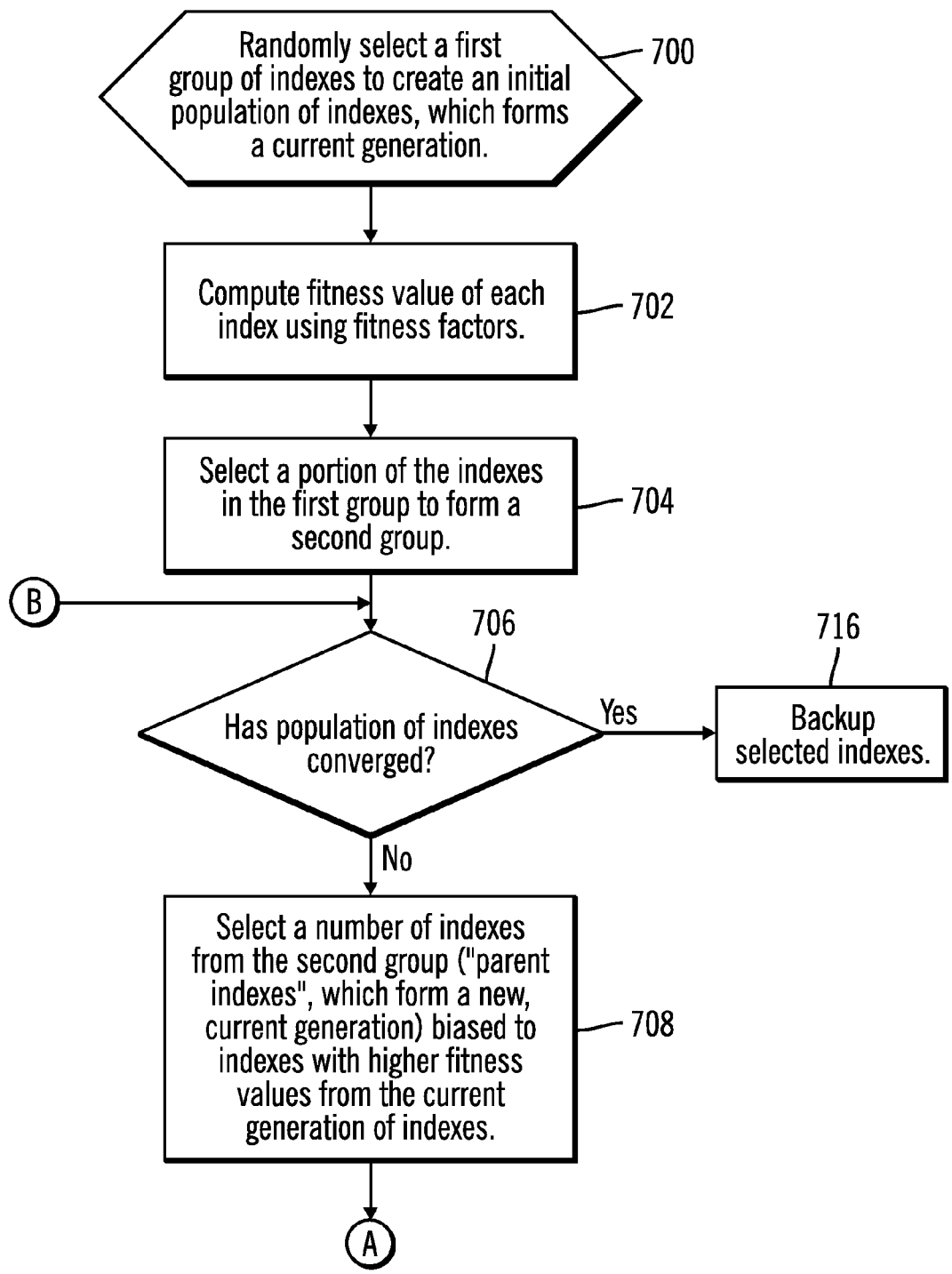
FIG. 7 illustrates, in a flow diagram, logic performed by a backup mediator to select one or more indexes for backup up in accordance with certain embodiments.
Figure 7B:
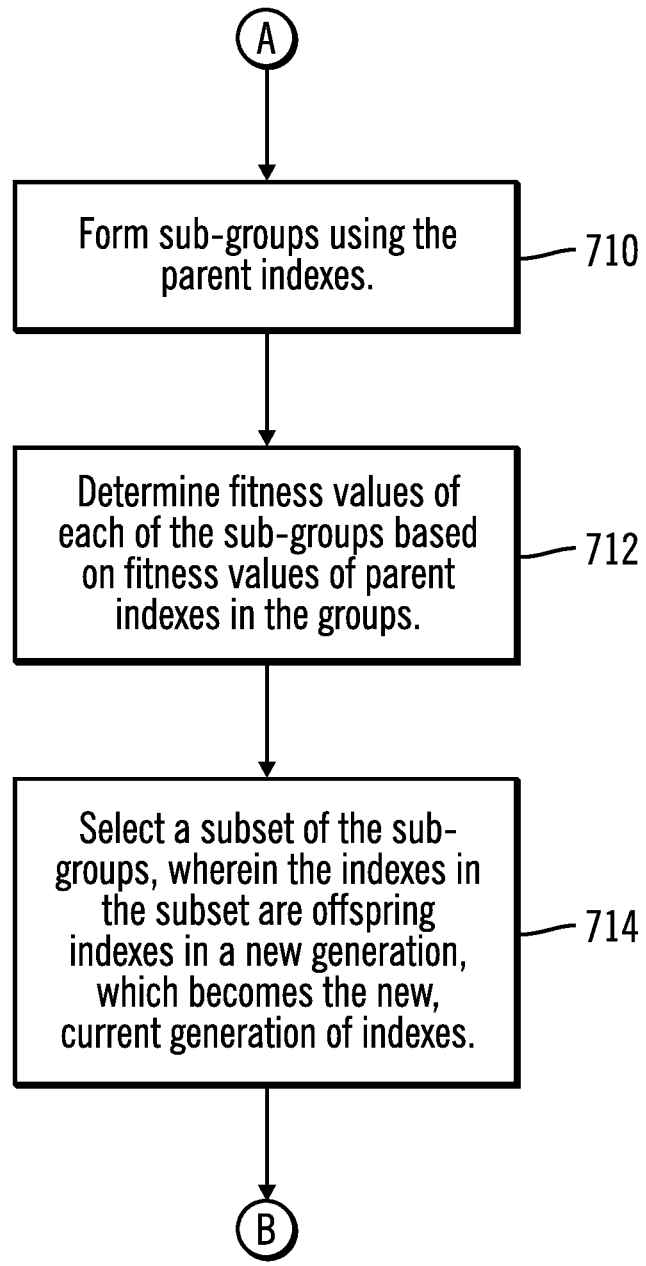

The backup mediator 420 applies the genetic technique in selecting the one or more indexes. FIG. 7 illustrates, in a flow diagram, logic performed by the backup mediator 420 to select one or more indexes for backup up in accordance with certain embodiments. FIG. 7 is formed by FIGS. 7A and 7B. Control begins at block 700 with the backup mediator 420 selecting (e.g., randomly) a first group of indexes from a larger group of indexes to create an initial population of indexes, which forms a current generation of indexes.

In block 702, the backup mediator 420 computes the fitness value of each index using the fitness factors. In block 704, the backup mediator 420 selects a portion of the indexes in the first group to form a second group. In certain embodiments, using heuristics, the backup mediator 420 may select a portion of the indexes using roulette wheel selection or elitist selection. In certain embodiments, a system administrator may override the selection technique. In block 706, the backup mediator 420 determines whether the population of indexes has converged (i.e., the fitness values for the indexes at one generation are similar or the same as the fitness values of one or more subsequent generations). If so, processing continues to block 716, otherwise, processing continues to block 708. In block 716, the selected indexes (i.e., the indexes in the current generation) are backed up.

In block 708, the backup mediator 420 selects a number of indexes from the second group ("parent indexes", which form a new, current generation) biased to indexes with higher fitness values from the current generation of indexes. In certain embodiments, using heuristics, the backup mediator 420 may select a portion of the indexes using roulette wheel selection or elitist selection. In certain embodiments, a system administrator may override the selection technique. From block 708 (FIG. 7A), processing continues to block 710 (FIG. 7B).

In block 710, the backup mediator 420 forms sub-groups (i.e., smaller groups) using the parent indexes. In block 712, the backup mediator 420 determines the fitness values of each of the sub-groups based on fitness values of parent indexes in the groups. That is, the backup mediator 420 sums up the fitness values of the parent indexes in a group to obtain a fitness value for that group. In block 714, the backup mediator 420 selects a subset of the groups, wherein the indexes in the subset are offspring indexes in a new generation of indexes, which becomes the new, current generation of indexes. In certain embodiments, using heuristics, the backup mediator 420 may select the subset of groups using roulette wheel selection or elitist selection. In certain embodiments, a system administrator may override the selection technique.

Figure 8:
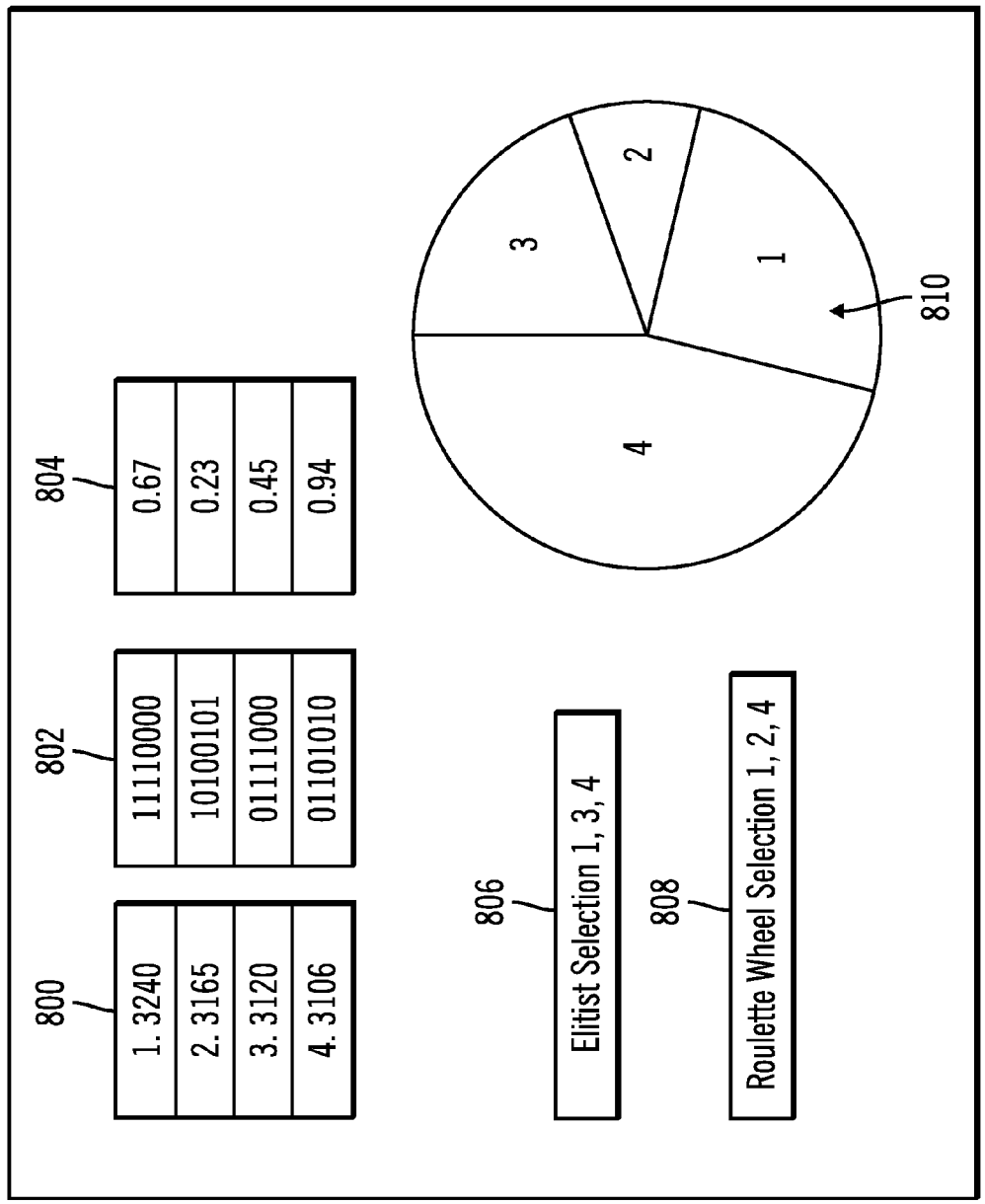
FIG. 8 illustrates, in a block diagram, an example in accordance with certain embodiments.

FIG. 8 illustrates, in a block diagram, an example in accordance with certain embodiments. In FIG. 8, there are four indexes (1, 2, 3, 4), and structure 800 illustrates a representation of each index based on fitness factors (e.g., based on what type of disk/number of disks, etc.). For example, for index 1, 3240 represents fitness factors for the index. These fitness factors are then represented using a binary number. Structure 802 illustrates a binary number for each index. Then, the backup mediator 420 calculates the fitness value for each index using some fitness function. Structure 804 illustrates a fitness value for each index. For this example, index 1 represented by 3240 (based on the fitness factors) and has a fitness value of 0.67. For example, the fitness function may be: (number of times index was used/(1000*estimated time required to copy index*power consumed to copy index))). Block 806 illustrates that elitist selection may choose indexes 1, 3, 4, while block 808 illustrates that roulette wheel selection may choose indexes 1, 2, 4. Pie chart 810 illustrates the allocation of fitness values for each of the indexes.

As another example, consider that there are three types of disks on which an index may reside:

SATA: 0001 (1)

SSD: 0010 (2)

Small factor drive: 0011 (3)

The values (1), (2), (3) represent each of these disks. Consider that the number of disks that the index is spread across is as follows:

0001 (1 disk)

. . .

. . .

1000 (8 disks)

As an example, the backup mediator 420 allocates one byte to each fitness factor, with a binary representation of the index as:

0001 0001

(index spread across 1 disk) (index on a SATA disk)

In certain embodiments, the backup mediator 420 uses a fitness function to determine a fitness value that is designed to maximize the gain ratio (where gain ratio may be described as balancing the quality of indexes versus the time required to backup the indexes) and minimize the root mean square error (RMSE) of the difference between the backup mediator 140 "derived" ranking and the user determined "actual" ranking of the listed indexes for a particular index, represented by:

$$RMSE = \sqrt{\frac{1}{m}\sum_{i=1}^{m}(R_{derived} - R_{actual})^2}$$

For the RMSE, "m" represents a total number of indexes, and "R" represents index weights. The index weights are assigned based on the fitness factors.

In the index subset selection optimization, the fitness function makes a rational tradeoff between minimizing time and maximizing quality of indexes. In certain embodiments, the implementation of the fitness function is a cumulative trending technique on common factors (e.g., disk performance, access statistics, and update history).

After selecting a set of indexes, the backup mediator 420 selects (e.g., randomly) one or more indexes from this set with the highest fitness values. Thereby, with the roulette wheel technique, the indexes are allocated space on a roulette wheel proportional to their fitness, and, thus, the fittest indexes (i.e., indexes with the higher fitness values) are more likely selected.

With crossover, offspring indexes are created by some crossover techniques. In certain embodiments, a one-point crossover technique is employed, which randomly selects a crossover point within the index. Crossover may be described as combining indexes in parent groups to form a new child index, and a crossover point may be described as an index in a parent group that is replaced to form the new child index. Then, parent indexes are interchanged to produce new offspring indexes. Such mutation prevents the genetic technique from converging too quickly in a small area of the search space. Finally, the new generation of indexes is judged by calculating new fitness values. If the new generation of indexes is selected to be the final generation of indexes, then optimized results are obtained. If not, then the evaluation and reproduction is repeated for a number of generations until a defined fitness (e.g., a pre-determined fitness value) or until a convergence criterion of the population are reached. In certain embodiments, the indexes of the last generation have the same attributes (i.e., columns) representing the optimal solution. By using the genetic technique optimization, the indexes are ranked according to the access history information (stored in the TCB) and the quality of the index ("prize return") based on the fitness values. Thus, in certain embodiments, the backup mediator 420 selects the top n indexes to construct an optimal subset.

Figure 9:
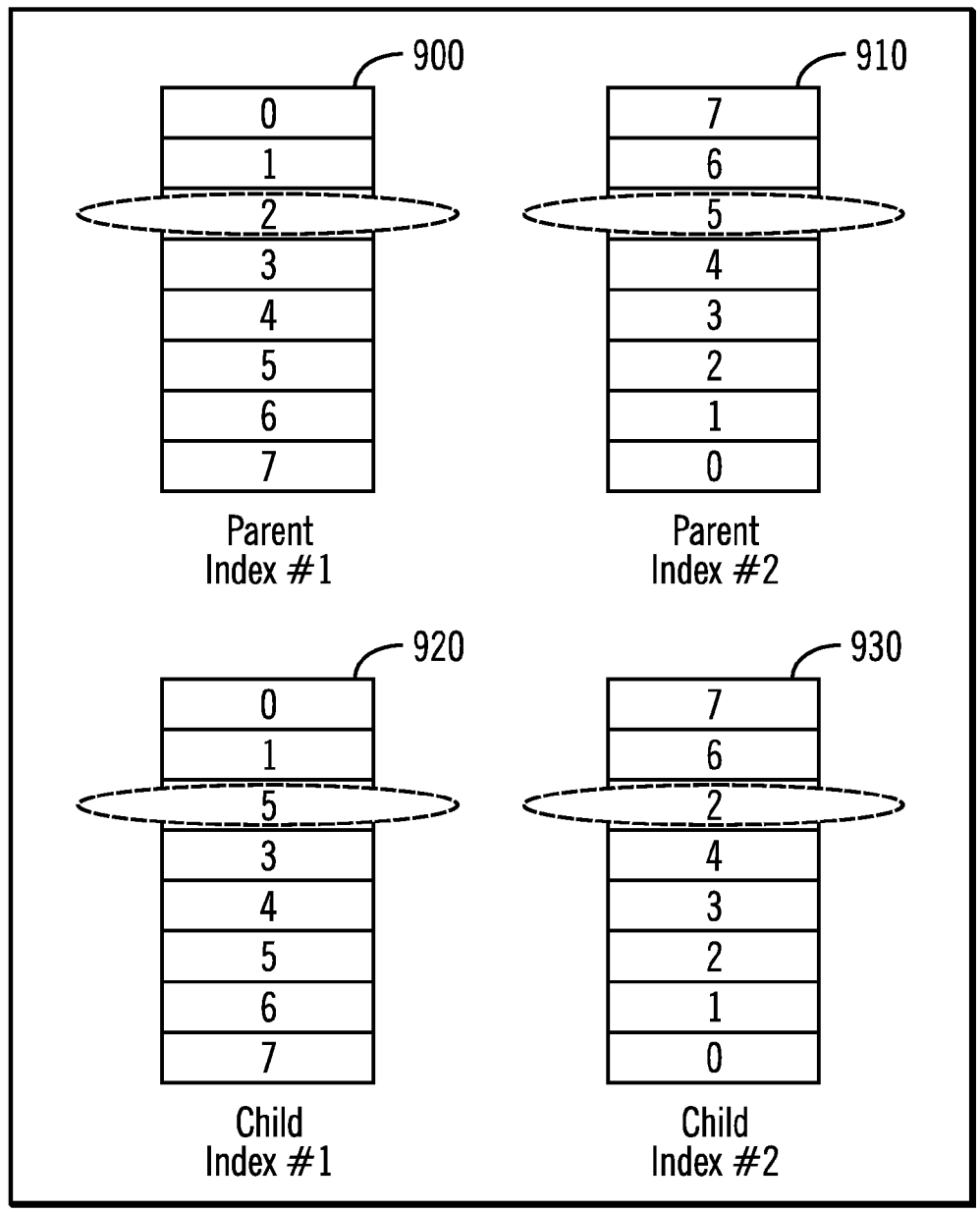
FIG. 9 illustrates, in a block diagram, crossover in accordance with certain embodiments.

FIG. 9 illustrates, in a block diagram, crossover in accordance with certain embodiments. In FIG. 9, there is a one point crossover by swapping a bit in position two of parent index #1 900 and in position five of parent index #2 910 to generate two new child indexes 920, 930.

Thus, in certain embodiments, the index can be designed as follows: each of the indexweight (w) is a composite of eight, sixteen or 32 bits, representing the value ranges from 0 to 255 and, thus, the normalized weight (x) of each index can be calculated with following Equation (1):

$$x_i = \frac{w_i}{\sum_{i=1}^{x} w_i} \qquad \text{Equation (1)}$$

Figure 10:
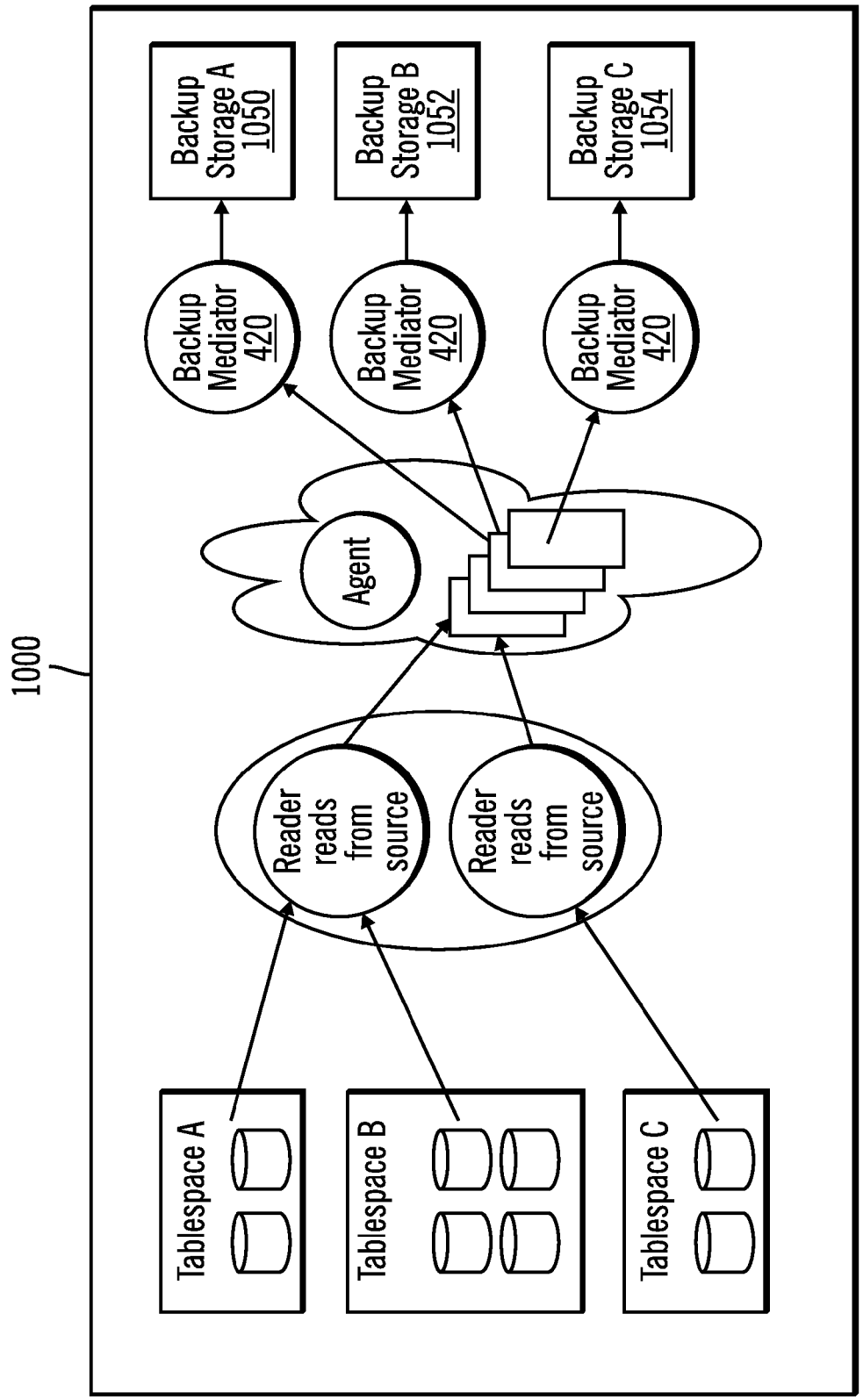
FIG. 10 illustrates, in a block diagram, parallelism in accordance with certain embodiments.

FIG. 10 illustrates, in a block diagram, parallelism in accordance with certain embodiments. In the architecture 1000 of FIG. 10, there are three backup mediators 420, and each one is associated with different backup storage 1050, 1052, 1054. This allows the multiple backup mediators 420 to backup data in parallel.

FIG. 11 illustrates sample pseudocode 1100, 1110 for a fitness function in accordance with certain embodiments. FIG. 11 is formed by FIGS. 11A and 11B. The pseudocode 1100, 1110 is merely one example for determining a fitness value of an index.

Embodiments improve performance with table backups and lead to power savings (e.g., because fewer indexes are being backed up). The backup mediator 420 overcomes the lack of flexibility of conventional systems by allowing a user to backup one or more selected indexes and by reducing the size of backups, which impact performance. The backup mediator 420 allows the user to recover/re-build indexes separately after a recovery. The backup mediator 420 overcomes the likelihood of an Input/Output (I/O) bottleneck with all indexes residing on a single tablespace by selecting a subset of indexes and by selecting indexes in different tablespaces for parallelism.

Thus, given time and resource constraints, the backup mediator 420 employs a set of factors to choose which indexes to backup automatically.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor and performs operations.

Figure 12:
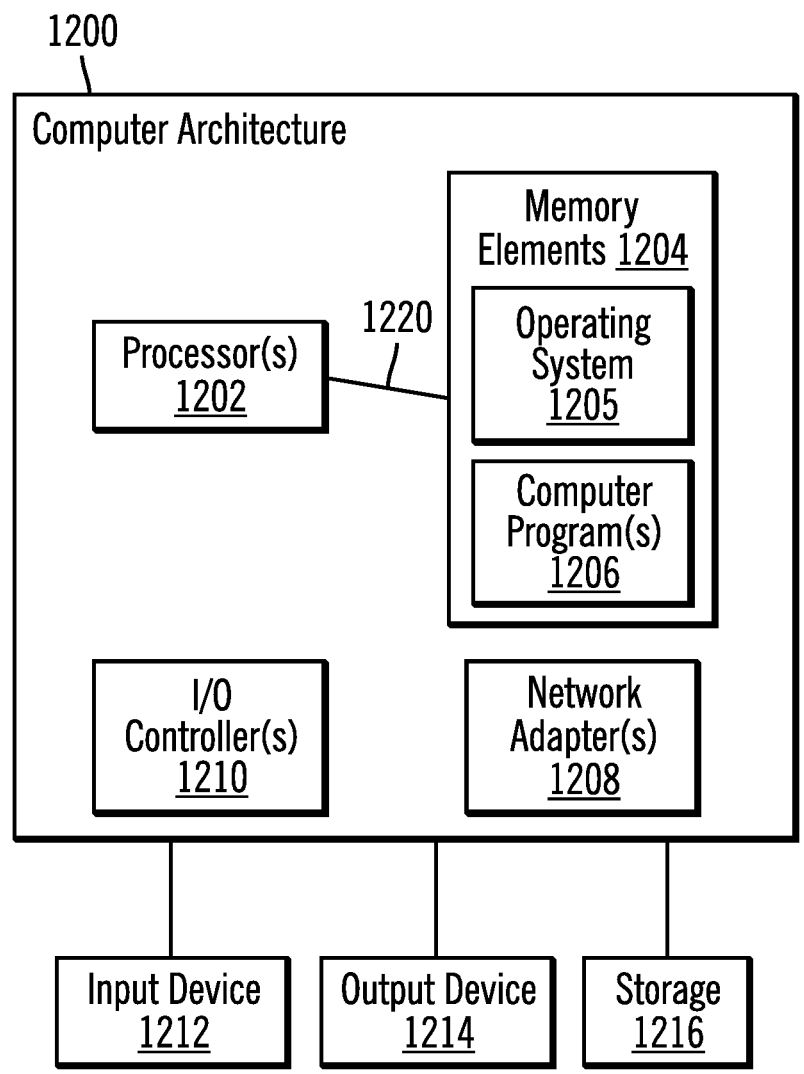
FIG. 12 illustrates, in a block diagram, a computer architecture that may be used in accordance with certain embodiments.

FIG. 12 illustrates, in a block diagram, a computer architecture 1200 that may be used in accordance with certain embodiments. Computing device 410 may implement computer architecture 1200. The computer architecture 1200 is suitable for storing and/or executing program code and includes at least one processor 1202 coupled directly or indirectly to memory elements 1204 through a system bus 1220. The memory elements 1204 may include local memory employed during actual execution of the program code, bulk storage, and cache memories which provide temporary storage of at least some program code in order to reduce the number of times code must be retrieved from bulk storage during execution. The memory elements 1204 include an operating system 1205 and one or more computer programs 1206.

Input/Output (I/O) devices 1212, 1214 (including but not limited to keyboards, displays, pointing devices, etc.) may be coupled to the system either directly or through intervening I/O controllers 1210.

Network adapters 1208 may also be coupled to the system to enable the data processing system to become coupled to other data processing systems or remote printers or storage devices through intervening private or public networks. Modems, cable modem and Ethernet cards are just a few of the currently available types of network adapters 1208.

The computer architecture 1200 may be coupled to storage 1216 (e.g., a non-volatile storage area, such as magnetic disk drives, optical disk drives, a tape drive, etc.). The storage 1216 may comprise an internal storage device or an attached or network accessible storage. Computer programs 1206 in storage 1216 may be loaded into the memory elements 1204 and executed by a processor 1202 in a manner known in the art.

The computer architecture 1200 may include fewer components than illustrated, additional components not illustrated herein, or some combination of the components illustrated and additional components. The computer architecture 1200 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A system, comprising:
   a processor;
   storage coupled to the processor, wherein the storage stores a computer program, and wherein the processor is configured to execute the computer program to perform operations, the operations comprising:
   determining a fitness value for each index among indexes that maximizes a gain ratio that balances a quality of the indexes and an amount of time to backup the indexes and minimizes a root mean square error of a difference between a derived ranking and a user determined ranking of the indexes, wherein the fitness value is determined based on one or more fitness factors, including reading indexes for backing up from faster storage first and reading indexes from worn storage later;
   selecting indexes from a first group of indexes in a current generation of indexes biased to indexes with higher fitness values;
   forming sub-groups of indexes using the selected indexes;
   determining fitness values of each of the sub-groups based on the fitness value of each of the indexes in the sub-groups;
   selecting a subset of the sub-groups;
   placing the indexes in the selected subset into a new generation of indexes;
   in response to determining that the indexes in the current generation of indexes and the new generation of indexes have similar fitness values, backing up the indexes in the new generation of indexes without backing up other indexes; and in response to determining that the indexes in the current generation of indexes and the new generation of indexes do not have similar fitness values, iterating through additional generations of indexes until in at least two of the generations of indexes have similar fitness values.

2. The system of claim 1, wherein the operations further comprise:
  randomly selecting the first group of indexes from a larger group of indexes.

3. The system of claim 1, wherein the operations further comprise:
  backing up the indexes in a newest generation of indexes after iterating through the additional generations of indexes.

4. The system of claim 1, wherein the fitness value is determined based on the one or more fitness factors, including (1) profiling of underlying storage technology and (2) calculating which storage are more worn out.

5. The system of claim 1, wherein the fitness value is determined based on the one or more fitness factors, including (1) selecting block indexes defined over most frequently used table partitions in a range partitioned table, (2) selecting high affinity indexes, (3) selecting indexes defined over user critical data, (4) selecting indexes with locality of reference, (5) selecting indexes which are least latched at time of backup process, and (6) selecting indexes such that distribution coefficient of the indexes and parallelism factor remains high.

6. The system of claim 1, wherein the operations further comprise:
  using a roulette wheel technique to select one of the indexes and the sub-groups.

7. The system of claim 1, wherein the operations further comprise:
  using elitist selection to select one of the indexes and the sub-groups.

8. A computer program product comprising a non-transitory computer readable storage medium including a computer readable program, wherein the computer readable program when executed by a processor on a computer causes the computer to perform:
  determining a fitness value for each index among indexes that maximizes a gain ratio that balances a quality of the indexes and an amount of time to backup the indexes and minimizes a root mean square error of a difference between a derived ranking and a user determined ranking of the indexes, wherein the fitness value is determined based on one or more fitness factors, including reading indexes for backing up from faster storage first and reading indexes from worn storage later;
  selecting indexes from a first group of indexes in a current generation of indexes biased to indexes with higher fitness values;
  forming sub-groups of indexes using the selected indexes;
  determining fitness values of each of the sub-groups based on the fitness value of each of the indexes in the sub-groups;
  selecting a subset of the sub-groups;
  placing the indexes in the selected subset into a new generation of indexes;
  in response to determining that the indexes in the current generation of indexes and the new generation of indexes have similar fitness values, backing up the indexes in the new generation of indexes without backing up other indexes; and
  in response to determining that the indexes in the current generation of indexes and the new generation of indexes do not have similar fitness values, iterating through additional generations of indexes until in at least two of the generations of indexes have similar fitness values.

9. The computer program product of claim 8, wherein the computer readable program when executed by the processor on the computer causes the computer to perform:
  randomly selecting the first group of indexes from a larger group of indexes.

10. The computer program product of claim 8, wherein the computer readable program when executed by the processor on the computer causes the computer to perform:
  backing up the indexes in a newest generation of indexes after iterating through the additional generations of indexes.

11. The computer program product of claim 8, wherein the fitness value is determined based on the one or more fitness factors, including (1) profiling of underlying storage technology and (2) calculating which storage are more worn out.

12. The computer program product of claim 8, wherein the fitness value is determined based on the one or more fitness factors, including (1) selecting block indexes defined over most frequently used table partitions in a range partitioned table, (2) selecting high affinity indexes, (3) selecting indexes defined over user critical data, (4) selecting indexes with locality of reference, (5) selecting indexes which are least latched at time of backup process, and (6) selecting indexes such that distribution coefficient of the indexes and parallelism factor remains high.

13. The computer program product of claim 8, wherein the computer readable program when executed by the processor on the computer causes the computer to perform:
  using a roulette wheel technique to select one of the indexes and the sub-groups.

14. The computer program product of claim 8, wherein the computer readable program when executed by the processor on the computer causes the computer to perform:
  using elitist selection to select one of the indexes and the sub-groups.

* * * * *